US012156006B2

(12) United States Patent
Cardinali et al.

(10) Patent No.: US 12,156,006 B2
(45) Date of Patent: Nov. 26, 2024

(54) ACOUSTIC COMPRESSION CHAMBER WITH MODALLY COUPLED ANNULAR DIAPHRAGM

(71) Applicant: B&C SPEAKERS S.p.A., Bagno a Ripoli (IT)

(72) Inventors: Valentina Cardinali, Bagno a Ripoli (IT); Andrea Casadei, Bagno a Ripoli (IT)

(73) Assignee: B&C SPEAKERS S.P.A, Bagno a Ripoli (IT)

( * ) Notice: Subject to any disclaimer, the term of this patent is extended or adjusted under 35 U.S.C. 154(b) by 0 days.

(21) Appl. No.: 18/143,198

(22) Filed: May 4, 2023

(65) Prior Publication Data

US 2024/0121558 A1 Apr. 11, 2024

Related U.S. Application Data

(60) Provisional application No. 63/339,592, filed on May 9, 2022.

(51) Int. Cl.
*H04R 7/02* (2006.01)

(52) U.S. Cl.
CPC .......... *H04R 7/02* (2013.01); *H04R 2400/13* (2013.01)

(58) Field of Classification Search
CPC .............................. H04R 7/02; H04R 2400/13
USPC .......................................................... 381/343
See application file for complete search history.

(56) References Cited

U.S. PATENT DOCUMENTS

| | | | | |
|---|---|---|---|---|
| 1,707,544 | A | 4/1929 | Thuras | |
| 1,845,768 | A | 2/1932 | Stokes | |
| 4,325,456 | A | 4/1982 | Ureda | |
| 4,619,342 | A | 10/1986 | Buck | |
| 6,320,970 | B1 * | 11/2001 | Czerwinski | H04R 1/30 381/430 |
| 8,121,330 | B2 | 2/2012 | Dodd | |
| 8,280,091 | B2 | 10/2012 | Voishillo | |
| 2004/0005069 | A1 | 1/2004 | Buck | |

(Continued)

FOREIGN PATENT DOCUMENTS

| | | | | |
|---|---|---|---|---|
| CN | 109803213 A * | 5/2019 | | G10K 13/00 |
| EP | 2640089 A2 | 9/2013 | | |

(Continued)

*Primary Examiner* — Jeremy A Luks
(74) *Attorney, Agent, or Firm* — CANTOR COLBURN LLP

(57) ABSTRACT

An electrodynamic compression driver is defined that contains a compression chamber assembly partially bounded by an annular diaphragm. The compression chamber assembly has an annular axisymmetric geometry with a single exit for acoustic radiation. The chamber geometry is further defined such that only the zero-hertz mode of acoustic coupling is supported, allowing the use of a lumped parameter model for analysis of the acoustic coupling of diaphragm and compression chamber. The lumped parameter model is integrated with eigenmode analysis of diaphragm modes and characterization of the cross-coupling between diaphragm and compression chamber. The result is more rapid computation of how to control mechanical modes in the annular diaphragm so that they benefit the compression driver's acoustic output. Embodiments of compression chamber and diaphragms with geometry that facilitate modal control are provided.

11 Claims, 5 Drawing Sheets

(56) References Cited

U.S. PATENT DOCUMENTS

| | | | | |
|---|---|---|---|---|
| 2006/0034475 | A1 | 2/2006 | Geddes | |
| 2006/0285712 | A1 | 12/2006 | Butler | |
| 2007/0147647 | A1* | 6/2007 | Voishvillo | H04R 1/30 381/343 |
| 2009/0310809 | A1* | 12/2009 | Voishvillo | H04R 1/345 381/343 |
| 2010/0027828 | A1 | 2/2010 | Vercelli | |
| 2010/0316248 | A1 | 12/2010 | Martinez-Iranzo | |
| 2011/0085692 | A1 | 4/2011 | Voishvillo | |
| 2014/0140569 | A1 | 5/2014 | Martinez Iranzo | |
| 2015/0373445 | A1 | 12/2015 | Voishvillo | |
| 2016/0105744 | A1* | 4/2016 | Voishvillo | H04R 1/30 381/343 |
| 2018/0255399 | A1* | 9/2018 | Voishvillo | H04R 1/28 |
| 2019/0149911 | A1* | 5/2019 | Voishvillo | H04R 13/00 381/423 |
| 2019/0222925 | A1* | 7/2019 | Ha | H04R 1/345 |

FOREIGN PATENT DOCUMENTS

| | | | | |
|---|---|---|---|---|
| EP | 3644623 | A1 * | 4/2020 | H04R 1/24 |
| EP | 4287645 | A2 * | 12/2023 | H04R 1/2873 |
| ES | 2325518 | B1 | 7/2010 | |
| JP | 2016082369 | A | 5/2016 | |
| JP | 2020527308 | A * | 9/2020 | |
| WO | 03086016 | A1 | 10/2003 | |
| WO | 2014081092 | A1 | 5/2014 | |

* cited by examiner

ACOUSTIC COMPRESSION CHAMBER WITH MODALLY COUPLED ANNULAR DIAPHRAGM

CROSS REFERENCE TO RELATED APPLICATION

This U.S. Non-provisional patent application claims the benefit of and priority to U.S. Provisional Patent Application No. 63/339,592, titled Acoustic Compression Chamber with Modally-Coupled Annular Diaphragm, and filed May 9, 2022, which is incorporated in its entirety by reference herein.

TECHNICAL FIELD

Embodiments relate to electrodynamic compression drivers that contain one or more compression chamber(s) partially bounded by annular diaphragm(s) where mechanical modes of the diaphragm have been analyzed for acoustic coupling to the compression chamber to the overall exit radiation.

BACKGROUND

Since the genesis of mechanical audio playback, sound reproduction has been constrained by the very different mechanical properties of air versus the materials of acoustic diaphragms. An enduring approach to addressing these challenges emerges in 1929, with Thuras' patent "Electrodynamic device" (U.S. Pat. No. 1,707,544A). Here a "stiff dish-shaped" vibrating diaphragm is clamped at its periphery within a "sound chamber." The diaphragm is then occluded with a "metallic plug" that allows acoustic vibrations to transition towards an exit over a constrained portion of the total surface area of the diaphragm. Sound then exits this assembly through an expanding channel that is commonly referred to as a horn, waveguide, or acoustic transformer (U.S. Pat. No. 4,325,456A).

The purpose of Thuras' construction was to have the air mass adjacent to the diaphragm more closely match the comparatively low compliance of the diaphragm, and then to gradually transition to match the higher compliance of free space. Colloquially this type of electrodynamic transducer became known as a "compression driver;" the metallic plug became commonly known as a "phase plug;" The volume between the diaphragm and the exit, which includes the phase plug, became known as the "compression chamber."

Over the intervening decades, many improvements have been made to this basic construction. Compression drivers also increased in size, in the quest for more sound output, lower frequency extension, or both. Due to the wide range of wavelengths involved in audio reproduction, larger diaphragms, sound chambers, etc. create acoustic structures that are more likely to have modal resonances within the bandwidth of frequency reproduction. Once dimensions of any mechanical structure within the electrodynamic transducer have dimensions comparable to the wavelength of sound, modal behavior is a possibility.

In the quest to move beyond Thuras' dome diaphragm construction, compression drivers using annular diaphragms are disclosed as early as 1932, see U.S. Pat. No. 1,845,768. Annular diaphragms have an advantage over dome diaphragms in that local geometry of the radiating diaphragm surface can have comparatively small radial dimensions with respect to wavelength while allowing both large total radiating area and strong electromotive driving assemblies.

Whether dome or annulus, conventional wisdom has been to avoid mechanical and/or acoustic resonances within vibrating membranes, associated compression chambers, and the overall compression driver assembly. Various optimizations have sought to reduce, avoid, or otherwise prevent coupling of additional diaphragm and/or compression chamber resonances to the acoustic output. Where additional modes cannot be avoided, efforts are made to move the modal frequencies out of the frequency range of the acoustic reproduction device.

Reduction of mechanical dimensions raises the frequencies of compression chamber and/or diaphragm modal behavior. Increasing the stiffness of a diaphragm also increases the frequency at which higher order modes begin in the assembly. Both of these modal avoidance methodologies are well established. For examples of compression drivers that have sought to reduce, avoid, or otherwise prevent coupling of modal behavior, see U.S. Pat. No. 8,121,330B2 for dome diaphragms and U.S. Pat. No. 8,280,091B2 for annular diaphragms. U.S. Pat. No. 8,280,091B2 discloses further reducing the maximum dimensions of an annular diaphragm geometry by dividing the total diaphragm radiating area into two separate, smaller annular membranes that oscillate anti-parallel to each other, with a common exit conduit to the interior of the annular diaphragms. Multiple, smaller, diaphragms and compression chambers reduce physical dimensions with the aim of moving resonances to higher frequencies, ideally out of the frequency range of exit radiation.

Modal behavior of all assemblies occurs eventually, if the frequency of the exit radiation is high enough. The historical focus on avoiding modes is a consequence of engineering expediency. If one constrains the dimensions of a subassembly to a size below the wavelength of the maximum frequency to be produced, then additional modes are not usually established. No additional computations are necessary to have positive outcomes from this rubric.

However, not all past disclosures seek to avoid modal behavior. For example, U.S. Pat. No. 10,531,200B2 contemplates two different fundamental mechanical resonances within a compression driver by means of two different annular diaphragms that have different diaphragm thicknesses and edge clamping. U.S. Pat. No. 10,327,068B2 proposes additional mechanical resonances in an annular diaphragm to increase sound pressure. Both of these patents mention simulation by numerical methods to help realize successful embodiments.

Even with the increase in computing power, and general availability of tools for numerical methods to simulate coupled mechano-acoustic systems, the design of compression drivers remains challenging. A full simulation of mechanical, acoustic, and fluid behavior results in slow simulations (e.g., days versus minutes). Further, the underlying models for engineering materials do not always reflect the acoustic response of physically realized drivers. Therefore, a reduction in simulation complexity is desirable to facilitate more rapid iteration of compression driver design.

SUMMARY

We present a compression chamber where mechanical modes of the chambers' associated annular vibrating diaphragm are controlled and coupled to the compression chamber in a manner that supports the overall acoustic output of the compression driver. The mechanical vibration modes of the diaphragm must be considered for frequency, amplitude, phase, and acoustic coupling to the overall exit radiation from the compression cavity.

To optimize the full combined mechano-acoustical system is non-trivial. The diaphragm mechanical modes, chamber acoustical modes, fluid behavior, and their various cross-interactions result in a large parameter space for simulation and optimization. We overcome limitations in the industry by disclosing an efficient approach for analyzing modal coupling to the acoustic exit radiation. To facilitate faster design, we define methods that:

1. Constrain the compression chamber design.
2. Define a lumped parameter model for calculation of acoustic coupling.
3. Calculate diaphragm modes in the absence of fluid effects.
4. Analyze only the zero-hertz acoustic coupling mode.

Since the design process does not consider higher order compression chamber acoustic modes, we start from a pre-defined compression chamber devoid of these modes. The chamber has dimensions chosen to support primarily the zero-hertz, or zero, acoustic mode. This condition is readily achievable for annular compression chambers because the radial dimension of the chamber is small, even with a large voice coil radius. Next, constraint of the compression chamber geometry to an annular design allows for the acoustic coupling analysis discussed below. While not a necessary condition for the calculations, a final requirement that the compression chamber be axisymmetric supports our aim of speeding up the analysis.

Our design cycle proceeds as follows:

1) Begin with an assembly comprising an annular diaphragm coupled to an annular, axisymmetric compression chamber cavity with a singular exit conduit.

The zero-hertz acoustic mode, or zero mode, of the compression chamber then represents the acoustic behavior in absence of any higher order acoustic wave components within the chamber:

2) Define the acoustic coupling behavior of the zero mode for the compression chamber and diaphragm by a lumped parameter model that has the general form of a bandpass filter.

Next is to consider the mechanical behavior of the annular diaphragm:

3) Perform eigenmode simulation of the annular diaphragm ignoring the effects of air on the diaphragm i.e., as if the diaphragm is in vacuum.

Eigenmode simulation of the diaphragm is achieved using finite element analysis (FEA), or other numerical methods. Removal of computation regarding fluid behavior adjacent to the vibrating diaphragm simplifies and speeds computations. Should they exist, closed form approaches may also be used for modal calculation in the diaphragm.

The next requirement is a method for analyzing the coupling between mechanical modes of the diaphragm and acoustic radiation response at the exit of the compression chamber. To develop this method, first we consider the 1953 work of B. Smith on suppression of acoustic cavity modes in a compression chamber with flat, rigid diaphragm. (See, B. H. Smith, "An Investigation of the Air Chamber of Horn Type Loudspeakers," J Acoust Soc Am, vol. 25, no. 2, pp. 305-312, March 1953). Smith's work sought to minimize mechanical coupling of an idealized (mode-free) diaphragm to high-order compression chamber acoustic modes. Smith's work was later extended by J. Oclee-Brown to consider modal coupling with non-rigid diaphragms. (See, J. Oclee-Brown, "Wideband compression-driver design. Part 1: a theoretical approach to designing compression drivers with non-rigid diaphragms," presented at the Audio Engineering Society Convention 139, 2015). Non-rigid diaphragms exhibit eigenmodes that may acoustically couple to the compression chamber.

While Oclee-Brown's formalism seeks to minimize the higher modal coupling factors ($\gamma_{nk}$) between diaphragm (k) and acoustic modes (n), his work contains a useful approach to instead consider intentional coupling of mechanical modes. The work of Oclee-Brown is used to define a general path between diaphragm eigenmodes and acoustic exit radiation of the compression chamber:

4) Calculate the "forced modal-coupling" levels between the annular diaphragm eigenmodes 3) and compression chamber considering only the zero acoustical mode as represented by 2) using Oclee-Brown.

The coupling for each higher diaphragm mechanical mode (k>1) is compared against the coupling of fundamental mode (k=1) with the zero acoustic mode (n=0) of the compression cavity. Oclee-Brown's formalism also considers n>0, but the lumped parameter model of (2) does not consider higher-order acoustic modes of the compression chamber.

1)-4) provide the baseline acoustic response of the compression chamber and the initial annular diaphragm geometry. With coupling between diaphragm eigenmodes and compression cavity quantified, the next step is to modify the geometry of the annular diaphragm:

5) Modify the annular diaphragm geometry in a manner to control, add, shift, remove, or otherwise manipulate its eigenmodes. Observe effects on the overall acoustic response by repetition of the analysis of 3) and 4).

The sequence of 1)-5) is performed in an iterative manner, where diaphragm geometry is repeatedly modified, and the resulting calculations are used to analyze the overall acoustic response. The diaphragm has its overall dimensions and geometric cross-section parameterized to facilitate iterative modification and computation of every new exit radiation coupling.

The resulting computations are simplified versus full mechano-acoustic simulation and provide correlation with the measured behavior of physical embodiments. The simplified calculation enables shorter iterations and a shortened design cycle. More rapid computation unlocks the possibility to define, analyze, test, and ultimately use diaphragm mechanical modes in a manner beneficial to the overall acoustic exit radiation of a compression driver.

BRIEF DESCRIPTION OF THE DRAWINGS

For a more complete understanding of this disclosure, reference is now made to the following brief description, taken in connection with the accompanying drawings and detailed description, wherein like reference numerals represent like parts, in which.

DETAILED DESCRIPTION

Figure 1:
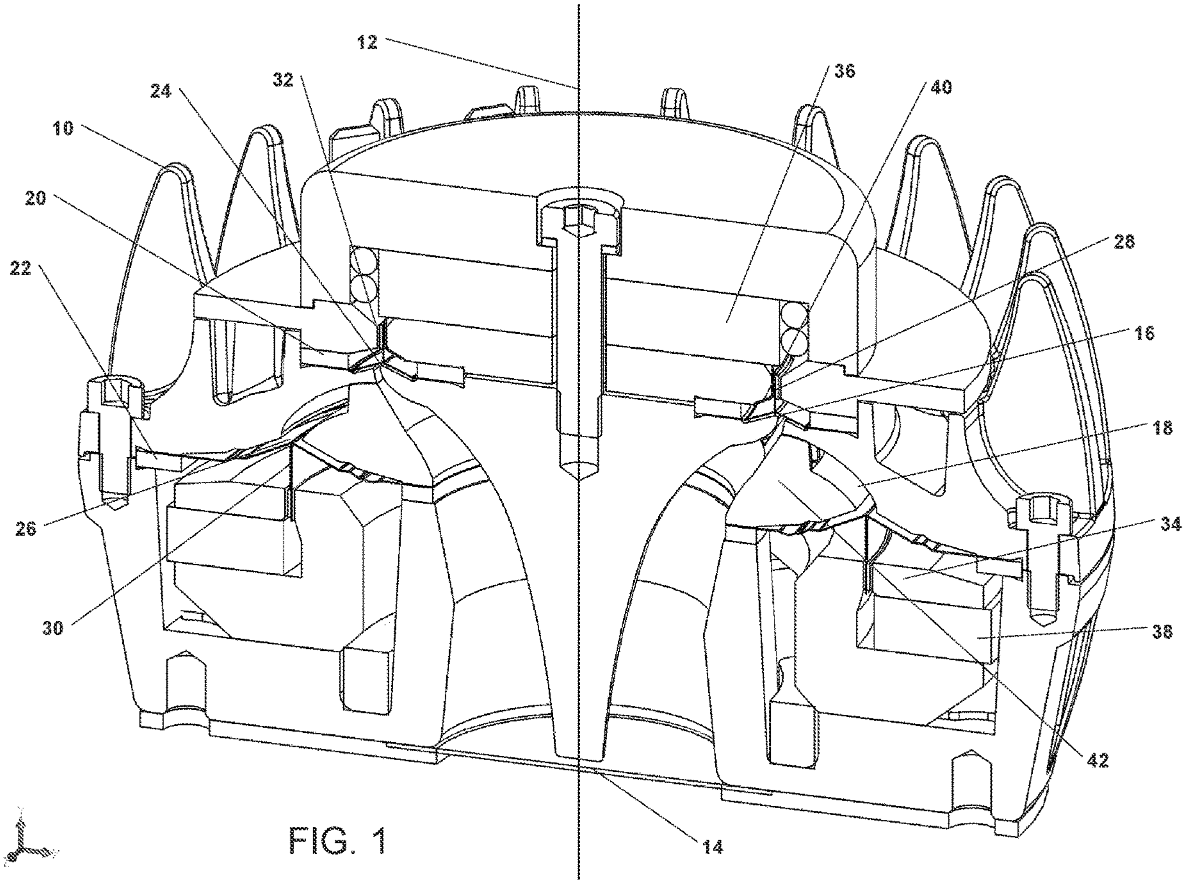
FIG. 1 is a dimetric projection of the cross-section of compression driver with the first and second annular compression chambers. The cross-section geometry of the second annular diaphragm in this assembly has been intentionally modified to create additional mechanical modes.

FIG. 1 shows an overall electrodynamic transducer assembly, or compression driver 10. This exemplary embodiment contains two compression chamber sub-assemblies (16, 18) each bounded by an annular diaphragm assembly (20, 22). The two compression chambers share a central axis of rotation 12. The diaphragms (24, 26) of each compression chamber driven by an electrodynamic voice coil (28, 30) contained in the flux of a magnetic motor assembly (32, 34). The motor assemblies derive their flux from permanent magnets (36, 38) and may include additional shorting rings/caps to minimize inductance and/or inductance modulation. The first compression chamber assembly 16 of the FIG. 1 embodiment has a copper shorting cap 40 on top of its corresponding motor assembly 32. Both compression chambers (16, 18) of FIG. 1 share a common exit 14 for acoustic radiation, but do not share a compression chamber. The "impedance mismatch" element 42 used to combine the acoustic radiation between the two compression chambers is the subject of U.S. Pat. No. 11,343,608 and U.S. patent application Ser. No. 17/750,526, the entire disclosure of which is incorporated by reference herein.

The dual compression chamber assemblies of FIG. 1 do not limit embodiments to multiple compression chambers, diaphragms, voice coils, and magnetic motor assemblies; exemplary embodiments can alternatively feature a single compression chamber sub-assembly. The embodiment of FIG. 1 shows multiple annular diaphragms (24, 26) that are not coplanar about their planes of vertical oscillation. This does not limit other configurations where multiple diaphragms are vertically coplanar or where multiple diaphragms otherwise share and bound an annular compression chamber with a singular exit. Throughout all embodiments, the defining aspect of compression chamber construction to enable the methods of simplified computation remains:

Compression chambers with primarily zero-mode acoustic coupling.

The compression driver of FIG. 1 contains a first diaphragm 24 with no intentional modification of the diaphragm mechanical modes, and a second diaphragm 26 where modal control is used to extend the diaphragm's operating bandwidth. As the additional mechanical modes occur near the maximum frequency of the diaphragm's operation and are acoustically coupled via the compression chamber, they boost the exit radiation at frequencies where the compression chamber sub-assembly 18 would otherwise begin to exhibit reduced acoustic output at the exit 14.

Figure 2:
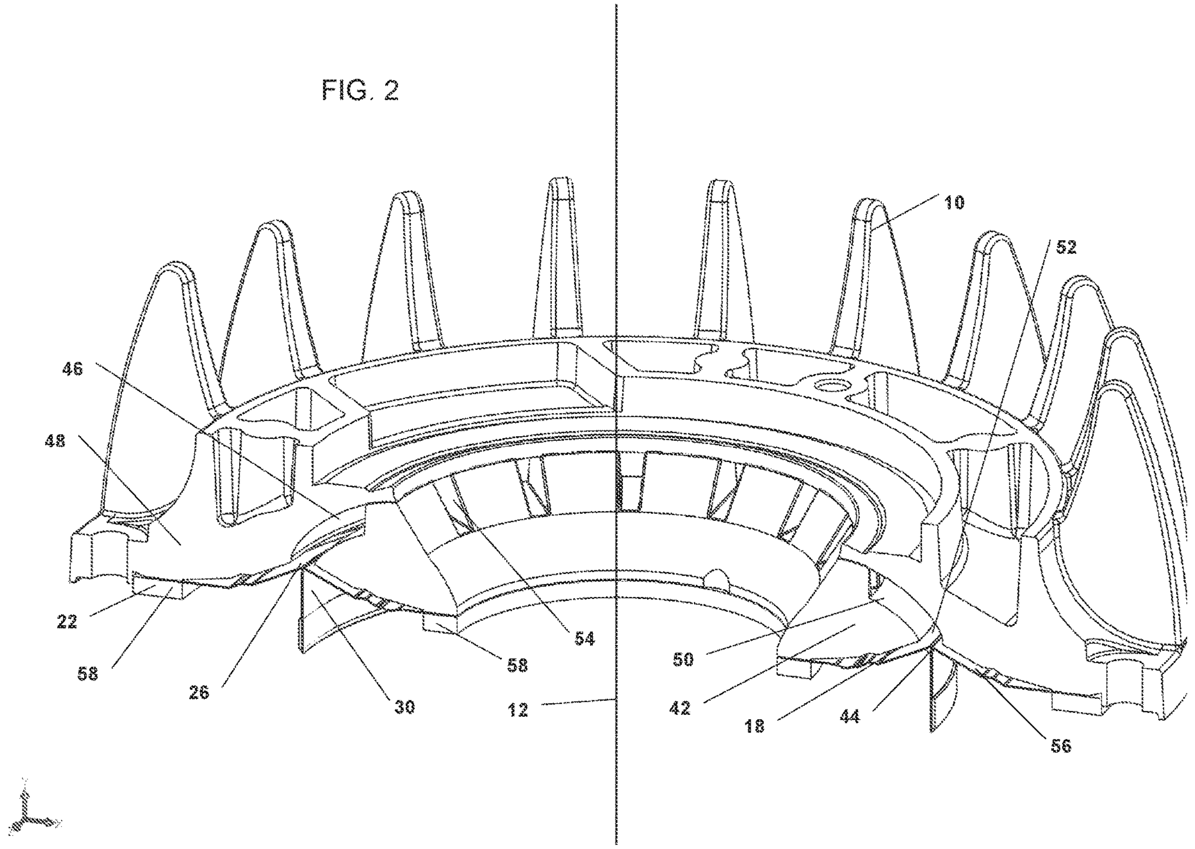
FIG. 2 is the same projection as FIG. 1, but with all additional features removed to focus on a single diaphragm, compression chamber, and voice coil.

FIG. 2 presents the view of FIG. 1 but shows only the second compression chamber 18, annular diaphragm assembly 22, diaphragm 26, and voice coil 30 that drives the diaphragm to oscillate. This second diaphragm 26 is the diaphragm whose geometric cross-section has been modified to introduce additional mechanical modes that couple to the exit radiation. The boundaries of the second compression chamber 18 are defined as follows:

1. The second compression chamber perimeter is bounded on one face by the second annular diaphragm 26, which is oscillated by the voice coil 30 that moves in the magnetic field of the motor assembly (not shown). The diaphragm 26 has the general form of an inverted "V," with the voice coil 30 mechanically attached at the peak of the V 44 below the compression chamber 18.
2. The inside and outside radii of the annular diaphragm assembly 22 are supported by a clamping ring 58. The ring assembly provides centering, mechanical support, and aids in even distribution of the clamping force around the perimeter of compression chamber 18.
3. Above the second diaphragm 26, one boundary surface of the compression chamber 46 is formed by the inside surface of the rear mechanical housing 48 of the compression driver. Because exit radiation is usually to the interior of the compression driver 14, the face defined by 46 is to the outside of the voice coil 30 radius. In addition to forming the compression chamber, this mechanical housing supports the first compression chamber 16 and acts as a heat sink for heat created by the voice coils (28, 30).
4. Above the diaphragm 26, the other boundary surface of the second compression chamber 18 is defined by the outside face 50 of the mechanical impedance mismatch element 42. Because exit radiation 14 is usually to the interior of the compression driver, the face defined by 50 is to the inside of the radius of the voice coil 30.
5. The beginning of the annular axisymmetric exit of the compression chamber 52 is defined via the gap between the inside face 46 of the mechanical housing 48 and the outside face 50 of the impedance mismatch element 42. The compression chamber exit termination 54 couples the acoustic compliance 56 adjacent to the diaphragm 26 to the exit radiation of the compression driver 14 through the body of the impedance mismatch device 42. The fundamental mode vertical oscillation of the diaphragm 26 is often a maximum at the peak of the overall V 44, where the voice coil 30 meets the diaphragm 26. Because of this, the compression chamber exit 52 begins approximately radially centered about the voice coil 30 to allow maximum vertical displacement of the diaphragm peak 44. Additional vertical diaphragm displacement supports more acoustic output at the lowest frequencies of operation.

The compression chamber of the embodiment in FIG. 2 could be mechanically bounded by other faces and/or assemblies as long as the chamber retains the general zero mode constraint necessary to facilitate calculations.

Figure 3:
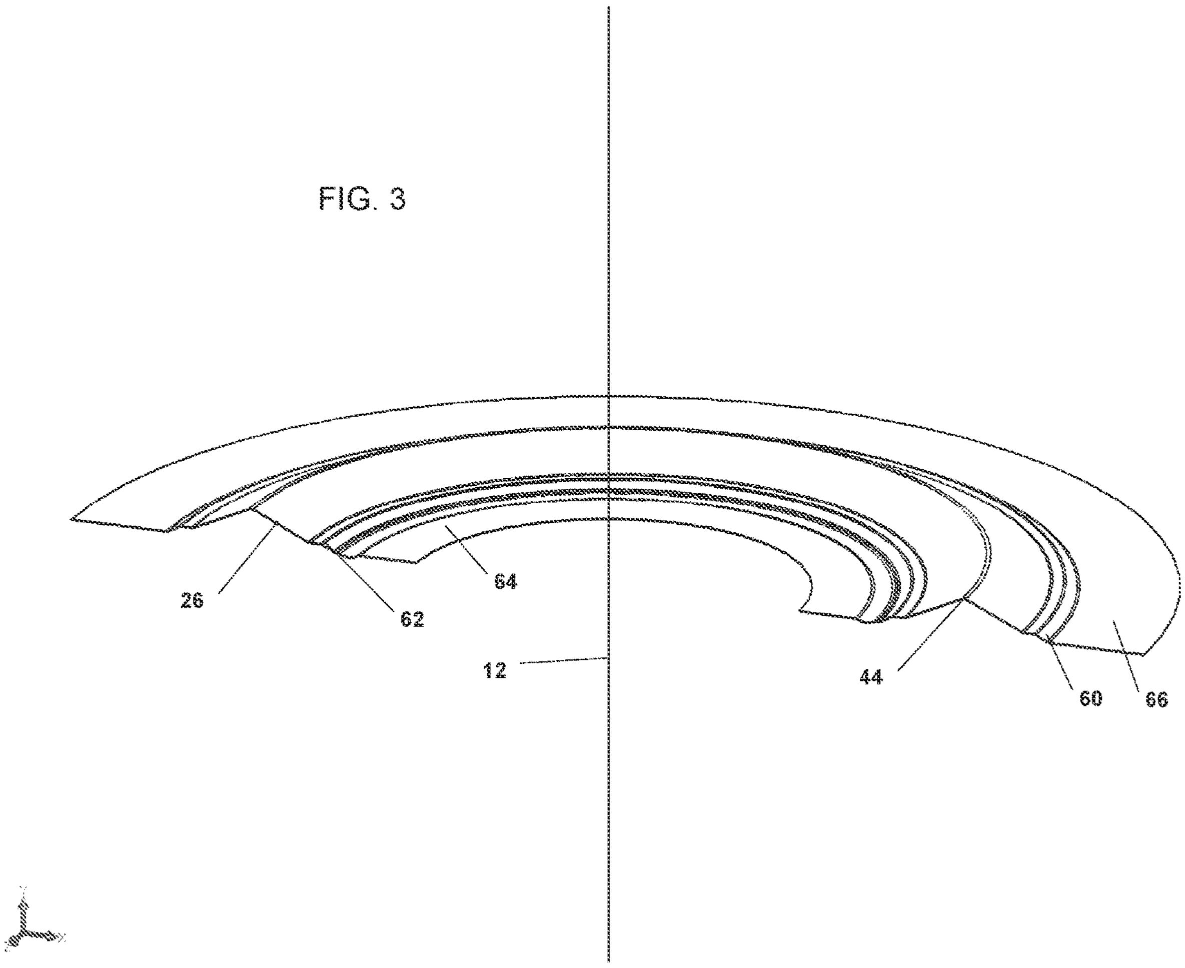
FIG. 3 is a cross-section of only the diaphragm geometry shown in FIGS. 1 and 2.

FIG. 3 shows only the diaphragm 26 from FIG. 2 in cross-section. Removing the voice coil 30 and clamping ring assembly 58 provides clarity on the geometric cross-section of the diaphragm. Both the inner and outer circumferences (64, 66) of the diaphragm 26 are retained mechanically at their perimeter, and do not experience a vertical displacement during oscillation. Control of the geometric cross-section results in creation and/or manipulation of mechanical modes in the diaphragm. The inverted V-shaped diaphragm geometry has additional substructure in the form of a pair of "steps" (60, 62) placed on either side of the diaphragm peak 44 where the voice coil 30 attaches. Steps are a useful modification of the base diaphragm cross-section due to straightforward parameterization, mechanical formability, minimal increase in diaphragm mass, and retention of nearly uniform cross section in the diaphragm material. Mechanically, the steps (60, 62) behave as areas of additional local stiffness in the diaphragm's cross-section.

Figure 4:
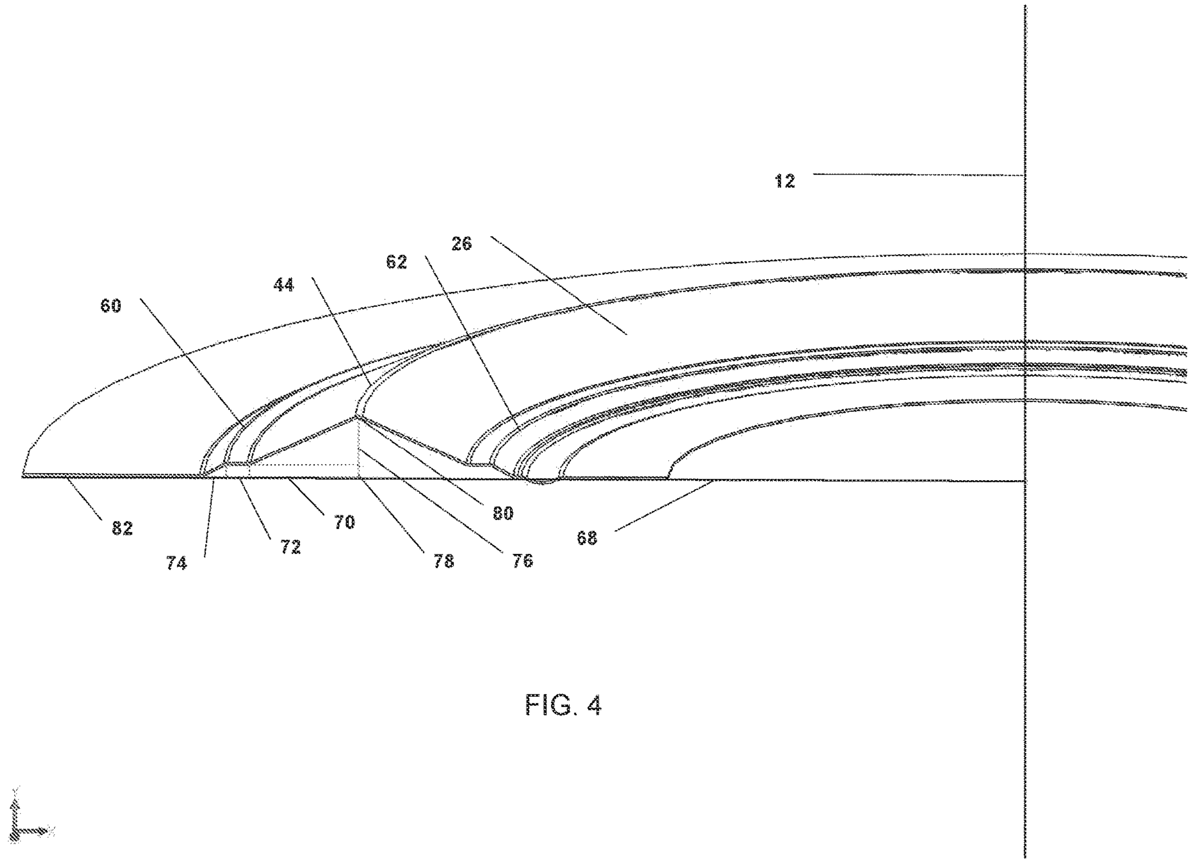
FIG. 4 is a parameterization of a diaphragm defined symmetrically about the diaphragm peak, with features of the parameterization labeled to correspond with FIG. 3.

FIG. 4 details parameterization of a diaphragm cross-section defined symmetrically about the diaphragm's overall V shape. Parameterization includes definitions of the radius 68 of the diaphragm with respect to the peak of the V 44, as well as the locations of the inner edge 70, peak 72, and outer edge 74 of the step 60. Corresponding diaphragm heights at the diaphragm peak 76 and across 78 the step 60 are defined. Diaphragm thickness 80 and width of clamped region 82 are also required. The other inner step geometry 62 is then a consequence of mirror symmetry about 44. Depending on the method of calculating eigenmodes in the diaphragm 26, other material parameters are defined. Potential parameters include Young's modulus, Poisson's ratio, loss tangent, density, and any parameters for material anisotropy.

The symmetric parameterization about 44 defined in FIG. 4 should not be construed to limit any other approach for defining the geometry of the annular diaphragm. There are numerous methods, variables, and coordinate systems that could be used to define the diaphragm surface. For instance, the entire diaphragm surface 26 could be point by point parameterized in 3D space or defined radially about the central axis of rotation of the diaphragm 12. Numerical methods and/or closed form solutions for diaphragm modal behavior can inform the choice of parameterization. Parametrization that retains rotational symmetry about the central axis of diaphragm rotation 12 may provide a more computationally efficient simulation of mechanical modes.

Figure 5:
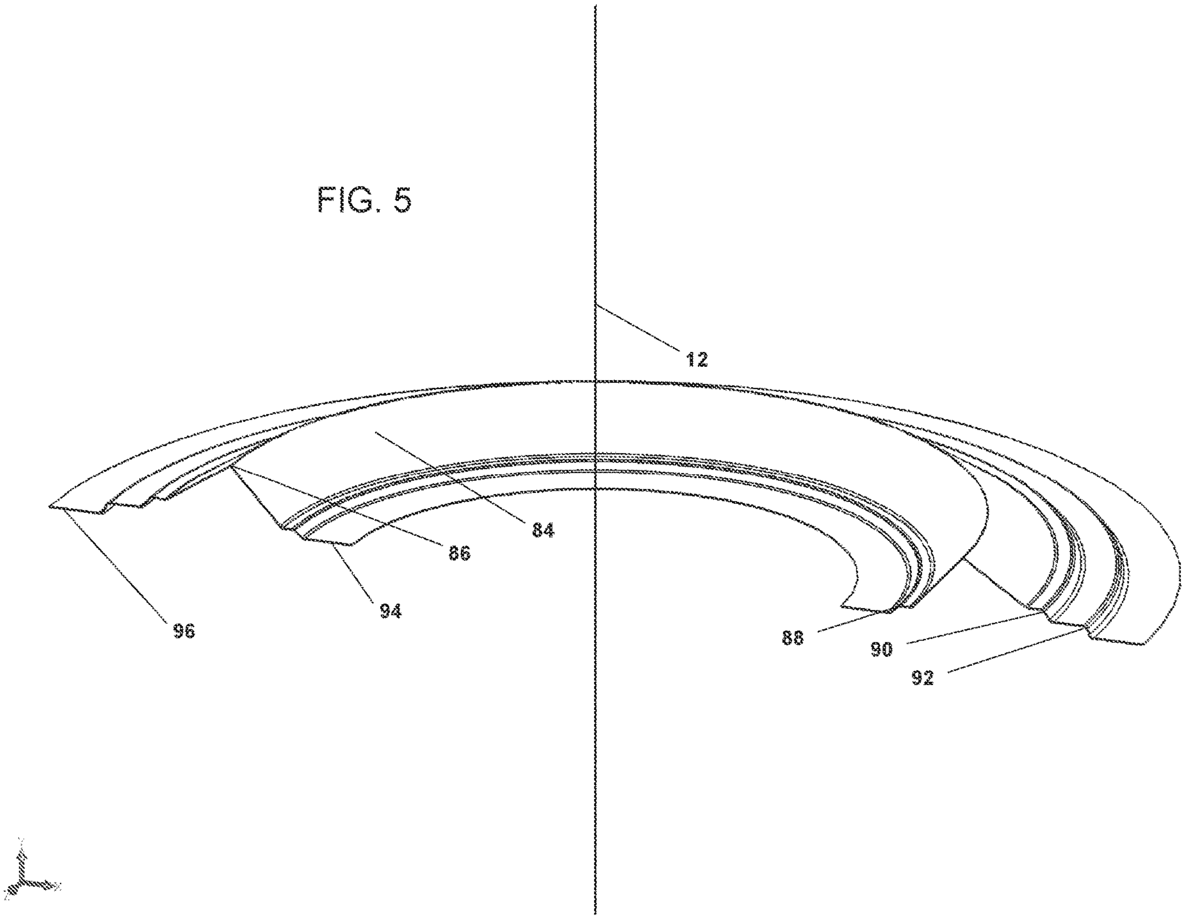
FIG. 5 is another diaphragm embodiment, in the manner of FIG. 3, showing a different configuration of geometric cross-section that results in different mechanical modes in the diaphragm.

FIG. 5 provides an additional embodiment of an exemplary annular diaphragm 84 with asymmetry of position of the diaphragm peak 86. Additionally, this embodiment has asymmetry in quantity and location of steps (88, 90, 92) with respect to the diaphragm peak 86. The areas of clamping (94, 96) may also have their own independent dimensions. The additional steps and/or asymmetry are utilized to: generate additional modes; damp new or existing modes; influence effectiveness of acoustic coupling to the compression chamber; modify mode location along the diaphragm; influence mode amplitude; change mode shape; control mode bandwidth.

Diaphragm mechanical modes, other than the fundamental mode, become a key consideration as frequency increases. In turn those mechanical modes have varying degrees of coupling to the acoustic compliance within the compression chamber that is adjacent to the diaphragm. To increase the acoustic output of the compression chamber assembly via modal control of the diaphragm requires both generating mechanical modes and ensuring that they couple acoustically in an advantageous way at the compression chamber exit. In mechanical systems, generation of one desirable mode can spur other less desirable modes. To best improve the acoustic performance, it is desirable to minimize the acoustic coupling of any unwanted diaphragm modes. Determining the interplay of introducing desirable diaphragm modes, and then controlling the coupling of secondary modes that may also result, is the driving force behind the methods herein. Practical development of compression drivers that utilize mechanical modes in a way that improves the exit radiation requires rapid analysis of the overall acoustic radiation. The disclosed achieves analysis in a more expedient manner than full simulation. The result is compression drivers with improved acoustic performance.

Various embodiments of the present invention are described herein with reference to the related drawings. Alternative embodiments can be devised without departing from the scope of this invention. It is noted that various connections and positional relationships (e.g., over, below, adjacent, etc.) are set forth between elements in the description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship.

The term "exemplary" is used herein to mean "serving as an example, instance, or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. Terms such as "connected to", "affixed to", etc., can include both an indirect "connection" and a direct "connection."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. An annular, axisymmetric compression chamber comprising:

an annular diaphragm having a geometry comprising a V-shape with a diaphragm peak and a first step disposed on a first side of the diaphragm peak and a second step disposed on a second side of the diaphragm peak opposite from the first side;

a compliance volume with a singular exit conduit having a perimeter that is partially bounded by the annular diaphragm; and a voice coil configured to electromechanically actuate the annular diaphragm to produce acoustic vibrations;

wherein the geometry of the annular diaphragm exhibits mechanical modes within a frequency range of operation which are actuated by movement of the voice coil and acoustically couple with a zero acoustic mode of the compression chamber.

2. The compression chamber of claim 1, wherein the compression chamber is dimensioned to suppress acoustic modes of the chamber, other than mode zero, in the frequency range of operation.

3. The compression chamber of claim 1, wherein the annular diaphragm is composed of a material with a largely uniform thickness.

4. The compression chamber of claim 1, wherein the annular diaphragm has a parametrically defined geometric cross-section configured to create mechanical modes of predetermined amplitude, phase, and frequency distribution.

5. The compression chamber of claim 1, wherein the compression chamber is integrated within an electrodynamic loudspeaker driver assembly.

6. The compression chamber of claim 1, wherein the annular diaphragm includes an outer circumference portion and an inner circumference portion, both extending concentrically around a central opening and around a central axis of the annular diaphragm, wherein the diaphragm peak is disposed between the inner and outer circumference portions and extends concentrically about the central axis.

7. The compression chamber of claim 6, further comprising a third step disposed adjacent to the first step on the first side of the diaphragm peak.

8. The compression chamber of claim 7, wherein the first and third steps are disposed proximate to the outer circumference portion and the second step is disposed proximate to the inner circumference portion.

9. The compression chamber of claim 8, wherein the first and third steps are asymmetrically shaped.

10. The compression chamber of claim 6, wherein the annular diaphragm comprises a radial axis substantially perpendicular to the central axis, wherein the first step includes an outer edge that extends from the outer circumference portion at an angle to the radial axis and an inner edge that extends from the outer edge to the V-shape of the annular diaphragm in a direction substantially parallel to the radial axis.

11. The compression chamber of claim 10, wherein the second step includes an inner edge that extends from the inner circumference portion at an angle to the radial axis and an outer edge that extends from the inner edge to the V-shape of the annular diaphragm in a direction substantially parallel to the radial axis.

* * * * *